United States Patent Office 3,216,809
Patented Nov. 9, 1965

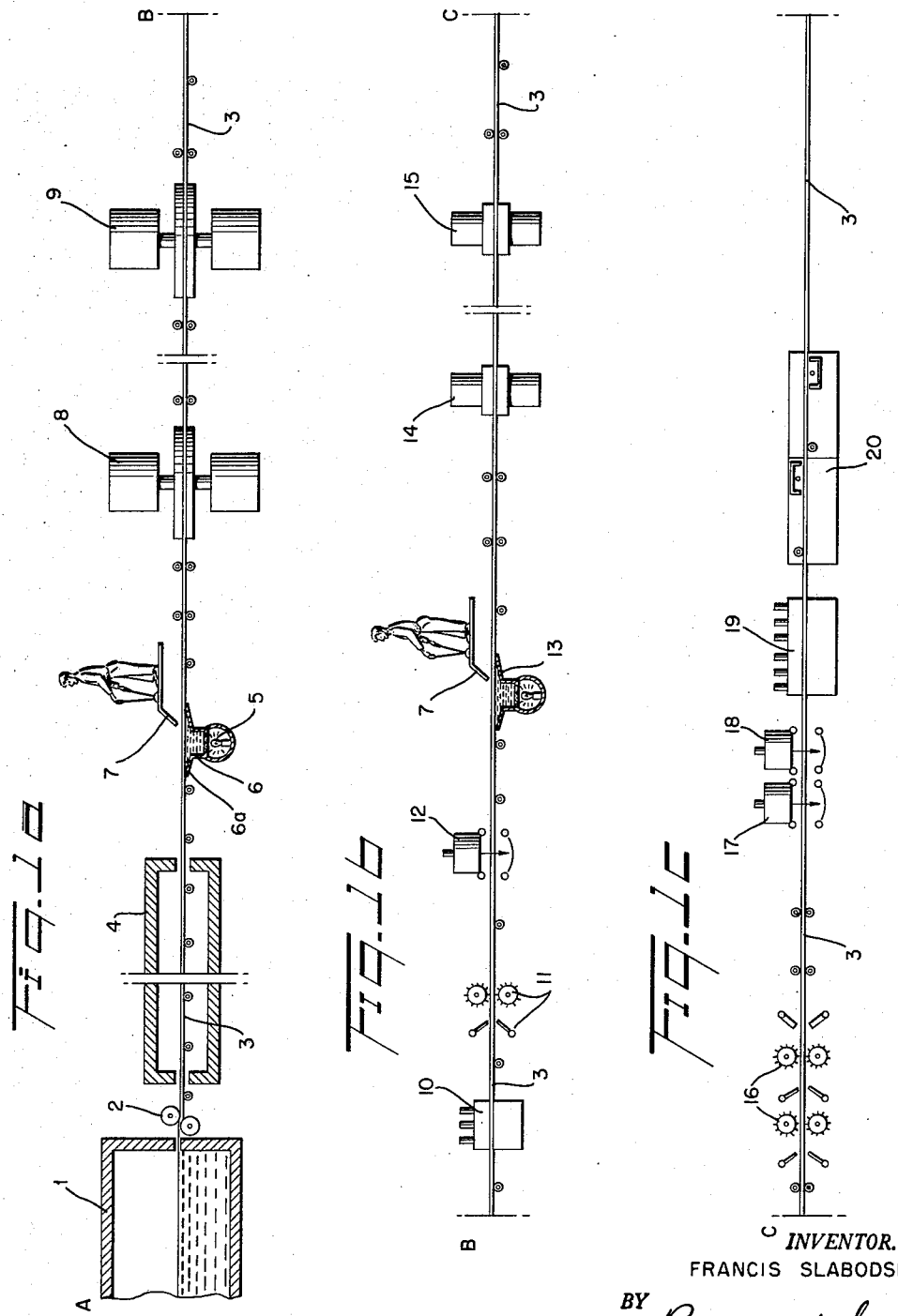

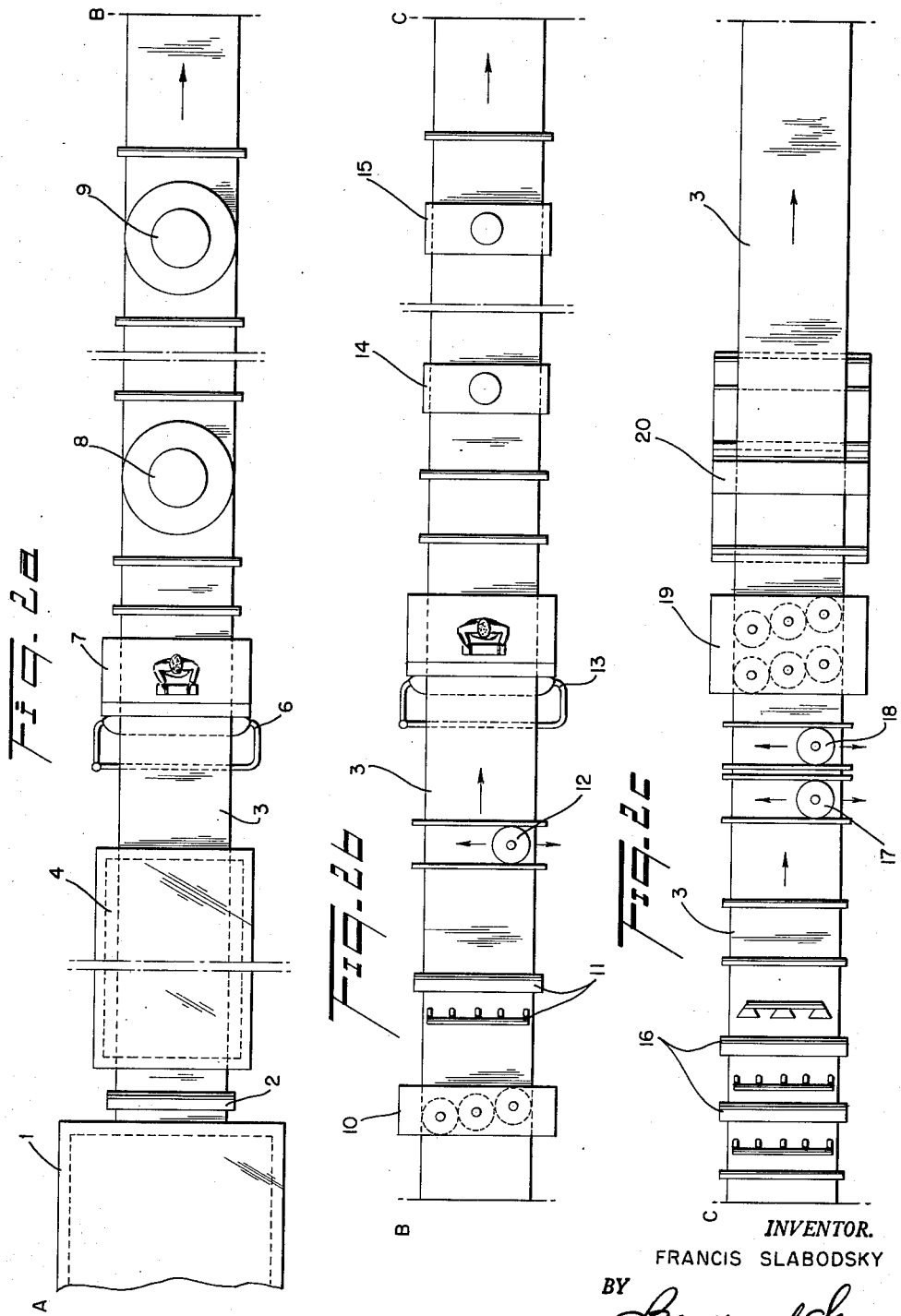

3,216,809
METHOD OF ANALYZING GLASS SHEETS FOR CUTTING
Francis Slabodsky, Paris, France, assignor to Compagnie de St. Gobain, Paris, France
Filed May 7, 1959, Ser. No. 811,633
Claims priority, application France, May 7, 1958, 765,032, Patent 1,195,715
9 Claims. (Cl. 65—29)

This invention refers to the manufacture of a continuous sheet or ribbon of glass and particularly to a method of manufacture in which the glass is ground and polished while it progresses away from the furnace and, after the completion of the polishing, is cut.

It is not generally realized outside the glass industry that the price of glass per unit of area is higher for larger pieces than for small. While every effort is made to minimize imperfections in the glass they do occur even in the most carefully worked sheets and frequently in locations which impose the cutting of the glass into small sheets with a consequent loss in value. So far as the inventor is aware no satisfactory method of attacking this problem has ever been devised.

The imperfections in glass arise from numerous sources, all of which are unpredictable, but among them may be mentioned internal imperfection arising from some fault of the manufactuer, surface imperfections arising from contact with faulty machinery, and surface imperfections introduced by the very machines which are supposed to remove imperfections. It is a most unfortunate characteristic of imperfections in glass that many of them are not easily detectible by visual inspection.

There are several methods of making glass sheets by continuous processes to which this invention can be applied, but it is described in connection with a standard method in which a sheet is produced horizontally from a furance between rollers which give it its dimensions, and is then passed through an annealing oven wherein it is cooled. The motion of the glass in this type of apparatus is horizontal.

In the illustrative process, the glass issuing from the furnace is rolled and pressed and the ribbon or sheet thus made moves successively into an annealing furnace, then to grinding and polishing means in which it is ground and polished on both faces. After these operations, the sheet is washed and is inspected to locate imperfections and is cut into panes. The cutting is a delicate operation requiring skilled labor which must take into consideration on one hand the number and size of panes which correspond to the orders which have been received by the factory and, on the other hand, the defects in the sheet. This operation of cutting, therefore, necessitates a plan or program which utilizes the area of the sheet to the best advantage by eliminating defects as far as possible and by reducing the subdivision of the sheet to a minimum. It is an object of the invention to prepare a continuous ribbon of glass for cutting, by locating in advance all sorts of defects and marking the locations thereof so that cutters, or cutting machines of automatic type, can prepare a cutting plan in advance and thus increase technical and economic efficiency.

It is an object of the invention to analyze a moving glass sheet for defects and to indicate the locations of the defects, on the glass sheet, for the preparation of a cutting plan. The cutting plan itself is not part of this invention, but is derived from the marks applied to the moving sheet during the operation of this invention.

According to the invention, the inspection is carried out not only at the end of the polishing operation but after each of the major operations so that all defects, whether present as a result of a previous operation or introduced by the present one, may be detected and marked. A part of this invention is the realization that the defects introduced by a previous operation may be covered up by a subsequent operation which does not totally remove them and that in consequence the usual inspection of the prior art is inadequate.

According to the present invention, the defects in the glass are located after each major stage of the operation following the annealing step. Where their nature permits, their repair or removal takes place as the ribbon advances. This can be done before they reach the cutter and in this way the cutting of the sheet in the final step is minimized. As to those which cannot be individually removed during the movement of the sheet toward the cutter, they are instantaneously exposed to the view of the cutter and marked so that the largest possible pieces may be obtained. It is even possible by the present method to employ cutting machines but the nature of these machines is not a part of this invention. After the cutting the various sizes are selected and packaged for delivery.

In practice apparatus of inspection are placed after the annealing furnace to locate gross internal defects, such as stones or bubbles which must be eliminated by the final cutting. Other apparatus of detection is placed after the grinders to locate smaller internal defects, such as little stones or bright seeds as well as defects of uniformity, for instance, of wave type. After the polishers other detection apparatus is placed for the location and marking of internal defects and defects of surface.

The information provided by the first two inspections allows the operator to prepare a cutting program which can be put into effect immediately after the last inspection. This produces a larger number of sheets of large sizes while it reveals defects which were likely to be missed by former methods.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like references characters refer to like parts throughout the several views, FIGS. 1a, 1b, and 1c taken together constitute a diagrammatic elevation of the type of apparatus described hereinabove with diagrammatic representation of the method of the invention.

FIGS. 2a, 2b, and 2c taken together constitute a plan view, also diagrammatic, of the drawings of FIG. 1.

In both figures the length of the process does require its presentation in three parts but it will be understood that in plant practice the movement of the glass in this type of apparatus will be continuous and horizontal. The apparatus will be seen in elevation when FIGS. 1a, 1b, and 1c are assembled in sequence with the lines B and C, respectively, coinciding. The apparatus will be seen in plan when FIGS. 2a, 2b, and 2c are assembled in sequence with the lines B and C, respectively, coinciding. In the illustrated apparatus of the drawings, a furnace 1 prepares molten glass which flows in a sheet to rollers 2 which roll and press it to uniform dimensions from whence it passes to an annealing furnace 4. As it issues from the annealing furnace the glass is inspected visually by an inspector who stands on a bridge 7 and is provided with means for marking the glass as it passes underneath. The glass passes before the inspector above a lighted zone which extends across the ribbon and receives its illumination from source 5 which is parallel to and across the ribbon. This lighting apparatus is provided with a reservoir 6 which holds liquid approximately the same index of refraction as the glass. The reservoir has a lip 6a which extends around it and contains a trough which catches the overflow from the reservoir. The reservoir wets the bottom of the glass and the trough 6a provides a reasonable measure of sealing. The light from source 5 passes upward through the liquid and the glass and reveals to the inspector any gross defects in the glass. The wetting of the surface of the glass eliminates the influence of the rough glass surface and thus permits the internal imperfections to be more readily revealed. The liquid used in the reservoir may be any which has a convenient index of refraction, such as glycerine, caster oil, toluene, benzene and water.

The inspector may mark the defects on a sheet of paper simulating the glass ribbon and directly controlled by means, for instance, of the hand rail of the inspection bridge. Defects can be marked in relation to the length of the ribbon and to the width thereof. Speed and size of paper sheet are proportional to ribbon speed and size, but slower. It is to be understood that this means of marking is only one way of marking the defects. Another successful method of indicating the location of defects is to mark only the edge of the sheet opposite the defect. Another method is to move a sheet along the edge of the glass at the same speed as the glass and to mark on this sheet, for instance of paper, the location of defects.

After this first inspection the sheet passes to the grinders 8, 9, which are operating simultaneously on opposite sides of the sheet. Thereafter, the sheet undergoes a first automatic inspection of ordinary type which relates to the perfection of the grinding itself. It is carried out by a known apparatus 10 with rotating heads shown in dotted lines in FIG. 2b which use short waves as described in the patent filed in the United States on January 14, 1958, Serial No. 708,929, now United States Patent No. 3,144,601, dated August 11, 1964.

After this inspection the glass is washed by known machines indicated at 11 and subjected to inspection by interferometer 12, which is of large field type and may conveniently be of the sort described in French Patent No. 1,132,969 having a delivery date of November 12, 1956. Thereafter, the glass is again subjected to the same type of inspection which followed the annealing furnace and is indicated at 13 in FIGS. 1 and 2 (b).

After this second inspection, the glass passes to polishers 14, 15, and from thence to washing machines 16 after which it is dried. After drying it is subjected to the final inspection to locate and mark internal defects and defects of surface still present after polishing or introduced by the polishers. The first apparatus for this inspection, 17, 18, is of the same type as apparatus 12 which operates by principles of interference and locates surface and internal faults. Thereafter, apparatus 19 of the same type as 10 locates internal defects, such as bubbles, stones, fine seeds and the like. A final apparatus 20 applies a solution which after evaporation leaves a residue which is responsive to ultra violet light. This machine applies the solution to both faces, dries the solution and directs ultra violet light through the glass after the solution has dried. This solution may be of any suitable type, but a successful one contains 1% of 3–6 dihydroxphthalimide. (For others, see Photosensitors, by Summer, Editors Chapman and Hall, 1957, page 392.) This solution, after drying, forms in the fine fissures of the surface a powder residue which becomes visible under ultra violet light and locates defects which would otherwise be invisible.

The discoveries made by the first and second inspections, and those after the annealing furnace and the grinders, enable the workmen to prepare cutting programs which are put into effect immediately after the third inspection, that which follows the polishing. It also enables to make improvements to the machine's operation. By means of these cutting plans, one proceeds to one or several successive stages of cutting. The cutting itself is obtained by automatically tracing cutting lines on the glass by means such as diamonds and scribes, aided by means for breaking the sheet along the inscribed line.

The apparatus for making the cuts and doing the cutting is not a part of this invention. When automatic cutting machines are not used and cutting is done manually by experts, their work is made more efficient by this invention so that the advantages obtained by manual and machine cutting are comparable.

The inspection operation between the annealing furnace and the grinders allows to draw up an inventory of the lengths of the glass ribbon which are free from defects that must be eliminated in the course of the exploitation; these lengths in meters may be for example in the following order: 6.25—5.60—3.25—7.63—9.27 etc.

The second inspection operation after grinding allows one to determine if the quality of the glass material constituting the ribbon is sufficient for the ordinary exploitation and to complete the inventory drawn up in the first inspection if some defects have not been determined during the first inspection.

As soon as this information has been transmitted to the post where the orders are prepared, the orders of great areas in execution are prepared on a band corresponding homothetically to the glass ribbon. For example the ribbon may receive in the first post of inspection a marking on the edge, opposite the located defect; the length between the markings is then automatically transmitted by apparatus embodying photo-electric cells to the post where the cutting orders are prepared. As an illustration, an order can be represented by a number of homothetic rectangles, corresponding to the areas to be cut out, which are placed onto a band simulating the ribbon of glass to indicate the defect free portions. A rational classification of the orders based on the utilization of the statistics revealing the defects which are to be eliminated, enable the operators to proceed to the preparation of the orders with superior efficiency.

The last inspection allows the determination of the utility of smaller areas which remain after the cutting out of the greater areas, according to the quality of the ribbon. The dimensions of these bands are given automatically by the differences between the dimensions of the portions of the ribbon free from defects to be eliminated and the areas to be cut out.

The rectangles that have served to simulate the great areas to be cut out can be directly utilized for the control of the cutting machines, the sorting stations, the packing in cases and even further for the establishment of the accountable documents. For example, these rectangles bearing notches or perforations serving to give the instructions for the cutting may be, thereafter, utilized for the establishment of the accountable documents. The rectangles moving in a control system start successively the cutting, the sorting and the packing operations and permit the control of all these operations.

The bands completing the portions free from defects or remaining after the cutting of large areas may be re-introduced in an auxiliary cutting line.

Although only a single embodiment of the invention has been illustrated in the accompanying drawings and described in the foregoing specification, it is to be expressly understood that the invention is not limited thereto.

What is claimed is:

1. A method of preparing a continuous ribbon of glass for cutting that comprises forming a glass ribbon and annealing it in an oven, wetting the ribbon with a liquid having an index of refraction similar to that of glass, inspecting the ribbon by light passing through the liquid and the glass, marking defects disclosed by the inspection, grinding both surfaces of the glass, inspecting the glass by short wave, marking defects revealed thereby, washing the glass ribbon, inspecting the glass by interferometer, marking defects revealed thereby, wetting the ribbon with a liquid having an index of refraction similar to that of glass, inspecting the ribbon by light passing through the liquid and the glass, marking defects revealed thereby, polishing the glass ribbon, washing and drying the ribbon, inspecting the ribbon for defects of homogeneity by interferometer, marking revealed defects, inspecting the ribbon for defects by short wave, marking revealed defects, applying an ultra violet responsive solution to the glass and drying it, inspecting the glass by directing ultra violet light thereon, marking observed defects, transmitting the several markings to a cutting station, and forming a cutting plan based on these markings and the dimensions of the commercial panels to which the ribbon is to be reduced, thereby preparing the glass for cutting.

2. A method of preparing a continuous ribbon of glass for cutting that comprises forming a ribbon of glass, moving it progressively through stages of annealing, grinding and polishing, wetting the surface of the ribbon with a liquid of similar index of refraction and inspecting the ribbon by light transmitted by the liquid after the cooling and grinding steps, inspecting the glass by short wave after grinding and after polishing, inspecting the glass by interferometer after grinding and after polishing, inspecting the glass by ultra violet light after polishing, marking defects revealed by the inspections, transmitting the said markings to a station, and forming a cutting plan from the said markings and the dimensions of the commercial sheets to be produced from the glass.

3. A method of preparing a continuous ribbon of glass for cutting that comprises forming a ribbon of glass, moving it progressively through stages of annealing, grinding, and polishing, inspecting the ribbon for defects after each stage and marking the defects revealed, the inspection after each stage comprising at least one of inspection by light transmitted through a liquid of index of refraction similar to that of glass, inspection by short wave, inspection by ultra violet light, and inspection by interferometer, the total inspection and marking including each of said methods of inspection, forwarding the several markings to a station, and combining them in a cutting plan for the glass.

4. A method for the continuous manufacture of glass panels from a ribbon of glass polished on both faces, which consists in inspecting the ribbon to detect and locate its defects following each successive stage of the manufacturing process following the annealing of the glass ribbon, in registering the indications on the defects and their locations as they are furnished, and in transmitting these indications to a station where a cutting plan is to be established from these indications and the dimensions of the commercial panels to which the ribbon is to be reduced.

5. An installation for the production of glass panels from a continuous glass ribbon comprising a melting furnace from which molten glass issues as a moving glass ribbon, an annealing furnace in which the ribbon is cooled, apparatus for grinding both surfaces of the moving ribbon, and polishing apparatus, characterized in that means for inspecting the ribbon of glass during its continuous displacement, and for registering and marking the location of the defects disclosed by these inspecting means, are provided after the annealing oven and before the grinders, after the grinding apparatus and before the polishing apparatus, and after the polishing apparatus, said inspection means including means operating by transmitted light, by ultraviolet light, by short wave, and by interferometer, and means to record the location of the imperfections revealed by the apparatus.

6. A method of continuously manufacturing glass, inspecting a moving ribbon of glass, and recording defects which comprises locating the defects in the glass sheet after the annealing furnace and each subsequent step of working the surface of the glass, recording the location of the defects thus discovered, forwarding the recordings with the sheet, establishing a cutting program on the basis of the recordings, and cutting the sheet in pieces which eliminate the defects revealed by the recordings.

7. A method of inspecting continuous glass sheets for defects which comprises continuously forming and annealing the sheet, inspecting the internal defects in the sheet between the annealing furnace and the grinders and recording the defects, inspecting the glass for internal and surface defects between the grinders and the polishers and recording the defects, inspecting the glass for surface defects after the polishers and recording the defects, forming a cutting program on the basis of the recordings, and cutting the glass into panels substantially free of such defects.

8. A method of producing sheets of glass from a continuous ribbon of glass comprising determining the positions of defects in the glass ribbon at a plurality of stages in the manufacture thereof subsequent to the annealing stage and utilizing the determinations to supply to glass cutting means a program which is a function of the dimensions of the glass sheets to be produced from the ribbon, the continuous ribbon of glass being inspected to locate and determine the position of defects therein after it is annealed, after it has been ground on both faces, and after it has been polished on both faces, recording the results of the several inspections, forwarding the record to a station, and preparing a cutting program therefrom based on the revelations of all the said records.

9. A method according to claim 8, wherein the sheet after annealing is inspected by means transmitting light through a liquid having an index of refraction similar to that of glass, after grinding is inspected by short wave, by interferometer, and by means transmitting light through a liquid having an index of refraction similar to that of glass, and after polishing is inspected by interferometer, by short wave and by ultra-violet light.

References Cited by the Examiner

UNITED STATES PATENTS

| | | |
|---|---|---|
| 1,874,217 | 8/32 | Arberry. |
| 2,176,480 | 10/39 | Waldron et al. |
| 2,239,263 | 4/41 | Waine et al. |
| 2,259,400 | 10/41 | Switzer. |
| 2,452,364 | 10/48 | Fowler et al. |
| 2,576,043 | 11/51 | Rendel. |
| 2,635,746 | 4/53 | Gordon _____ 73—69 X |
| 2,710,512 | 6/55 | Cronan _____ 51—283 |
| 2,871,940 | 2/59 | Meumier. |

FOREIGN PATENTS

| | | |
|---|---|---|
| 163,225 | 6/55 | Australia. |
| 736,464 | 9/55 | Great Britain. |

OTHER REFERENCES

Literature reference, "Plate Glass Manufacture," found in "The Glass Industry," December 1940, one page.

DONALL H. SYLVESTER, *Primary Examiner.*

CHARLES R. HODGES, ARTHUR P. KENT, MORRIS O. WOLK, *Examiners.*